(12) United States Patent
Matsumoto

(10) Patent No.: US 7,561,860 B2
(45) Date of Patent: Jul. 14, 2009

(54) RECEIVER

(75) Inventor: Yutaka Matsumoto, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 519 days.

(21) Appl. No.: 11/299,850

(22) Filed: Dec. 13, 2005

(65) Prior Publication Data
US 2006/0135112 A1    Jun. 22, 2006

(30) Foreign Application Priority Data
Dec. 17, 2004  (JP) ............................. 2004-365788

(51) Int. Cl.
*H04B 1/18*    (2006.01)
(52) U.S. Cl. ................. 455/189.1; 455/168.1; 455/296; 455/234.1; 375/324; 375/1
(58) Field of Classification Search ............... 455/189.1
See application file for complete search history.

(56) References Cited

U.S. PATENT DOCUMENTS 5,052,050 A * 9/1991 Collier et al. ............... 455/296
5,878,088 A * 3/1999 Knutson et al. ............. 375/324
6,795,559 B1   9/2004 Taura et al.
7,120,406 B2 * 10/2006 van der Burgt ........... 455/168.1
2003/0092412 A1 * 5/2003 Wu ......................... 455/234.1

FOREIGN PATENT DOCUMENTS

JP    2000-101463    4/2000

\* cited by examiner

*Primary Examiner*—Yuwen Pan
*Assistant Examiner*—Ajibola Akinyemi
(74) *Attorney, Agent, or Firm*—Oblon, Spivak, McClelland, Maier & Neustadt, P.C.

(57) ABSTRACT

AM receiver 20 is provided with antenna 1, RF amplifier 2, I/Q mixer 3, VCO 4, impulse noise detector 5, interpolator 6, BPF 7, IF amplifier 8 and AM detector 9. I/Q mixer 3 is composed of I mixer 11a as an in-phase mixer and Q mixer 11b as an orthogonal mixer. Impulse noise detector 5 generates an interpolation signal from in-phase and orthogonal output signals from I/Q mixer 3. Interpolator 6 carries out shaping of waveforms of the output signals from I/Q mixer 3 in response to the interpolation signal and eliminates impulse noises from the output signals from I/Q mixer 3.

3 Claims, 10 Drawing Sheets

IMPULSE NOISE

90° PHASE SHIFT

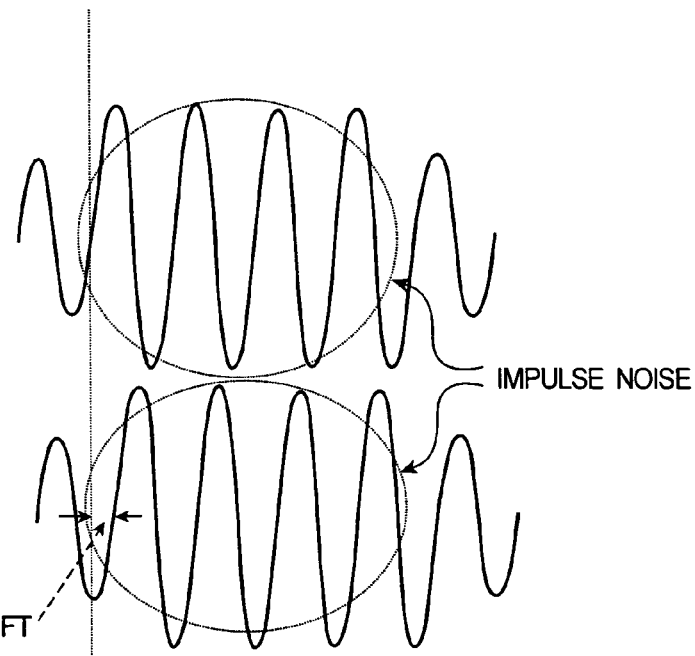
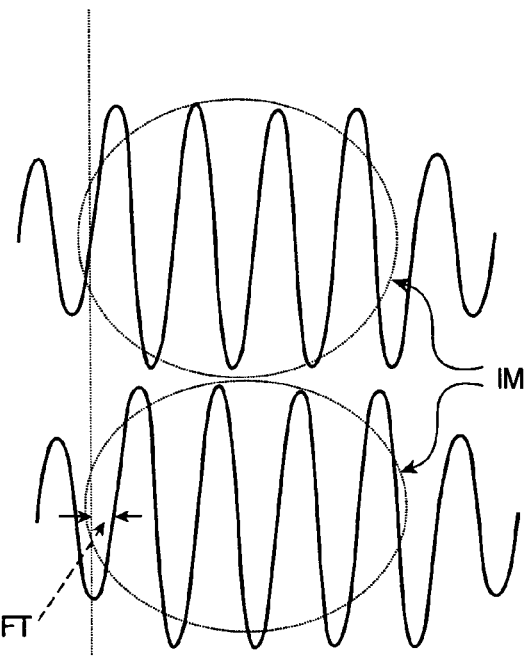
FIG. 4A
FIG. 4B
90° PHASE SHIFT
FIG. 4C
FIG. 4D — NOISE THRESHOLD
FIG. 4E — VIBRATOR THRESHOLD
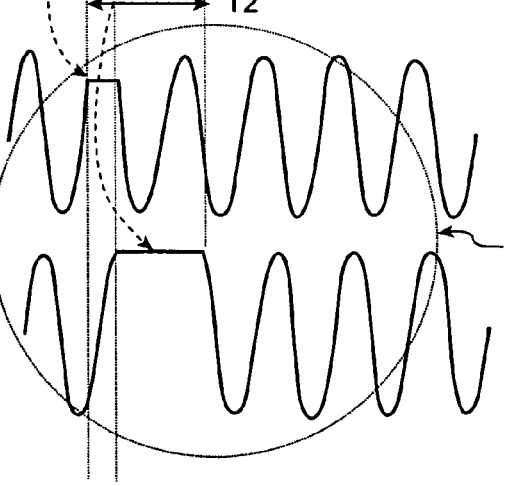
FIG. 4F — IN-PHASE IF SIGNAL
FIG. 4G — REDUCTION OF IMPULSE NOISE / ORTHOGONAL IF SIGNAL (90° PHASE SHIFT)

RECEIVER

CROSS-REFERENCE OF RELATED APPLICATIONS

This application is based upon and claims the benefit of priority from the prior Japanese Patent Application No. 2004-365788, filed on Dec. 17, 2004, the entire contents of which are incorporated herein by reference.

FIELD OF THE INVENTION

This invention generally relates to a receiver and, more particularly, to an AM or FM receiver used for a radio, tuner, or the like.

BACKGROUND OF THE INVENTION

An AM radio or AM tuner particularly installed in a car to receive amplitude-modulated electromagnetic waves through its antenna suffers impulse noise from the ignition of your own car or cars of others, tram noise from tramcars or motor noise from electrically driven cars. In order to reduce such impulse noise components, a noise canceller is conventionally often used (see Japanese Unexamined Patent Publication No. 2000-10463). The noise canceller is provided with an automatic gain control (AGC) circuit which compensates fluctuations in electric fields of receiving signals to securely detect noise components on the basis of a reference voltage.

Since AM input signals in particular, however, vary their amplitudes, the input signals cannot be sufficiently separated from irregular impulse noise at the detection of noise components on the basis of a reference.

The present invention provides an AM radio or AM tuner with the reduction of impulse noise mixed in receiving signals.

SUMMARY OF THE INVENSION

A receiver in accordance with one embodiment of the present invention is provided with an antenna to make a received signal out of a transmitted signal, a local oscillator to generate a reference local oscillation signal and an orthogonal local oscillation signal phase-shifted by 90° from the reference local oscillation signal, an I/Q mixer including an I mixer and a Q mixer wherein the I mixer mixes the received signal with the reference local oscillation signal from the local oscillator and the Q mixer mixes the received signal with the orthogonal local oscillation signal from the local oscillator, a noise detector to carry out peak and differential detections of output signals from the I and Q mixers to detect impulse noises in a form of a pulse signal from the received signal, and an interpolator to carry out shaping of waveforms of the output signals from the I and Q mixers in response to the pulse signal.

A receiver in accordance with another embodiment of the present invention is provided with an antenna to make a received signal out of a transmitted signal, a first local oscillator to generate a reference local oscillation signal and an orthogonal local oscillation signal phase-shifted by 90° from the reference local oscillation signal, an I/Q mixer including an I mixer and a Q mixer wherein the I mixer mixes the received signal with the reference local oscillation signal from the local oscillator and the Q mixer mixes the received signal with the orthogonal local oscillation signal from the local oscillator, a noise detector to carry out peak and differential detections of output signals from the I/Q mixer to detect impulse noises in a form of a pulse signal from the received signal, a first interpolator carrying out shaping of waveforms of the output signals from the I/Q mixer in response to the pulse signal, a demodulator connected to the first interpolator, and a second interpolator which carries out shaping of waveforms of the output signals from the demodulator in response to the pulse signal from the noise detector.

BRIEF DESCRIPTION OF THE DRAWINGS

A more complete appreciation of the present invention and many of its attendant advantages will be readily obtained as the same becomes better understood by reference to the following detailed descriptions when considered in connection with the accompanying drawings, wherein:

FIGS. 2A-2G are timing charts at the input of one impulse noise to the AM receiver shown in FIG. 1;

FIG. 4A-4G are timing charts of the AM receiver shown in FIG. 1 at the time when its received signal contains neighboring disturbing signals;

DETAILED DESCRIPTION OF THE INVENTION

Figure 1:
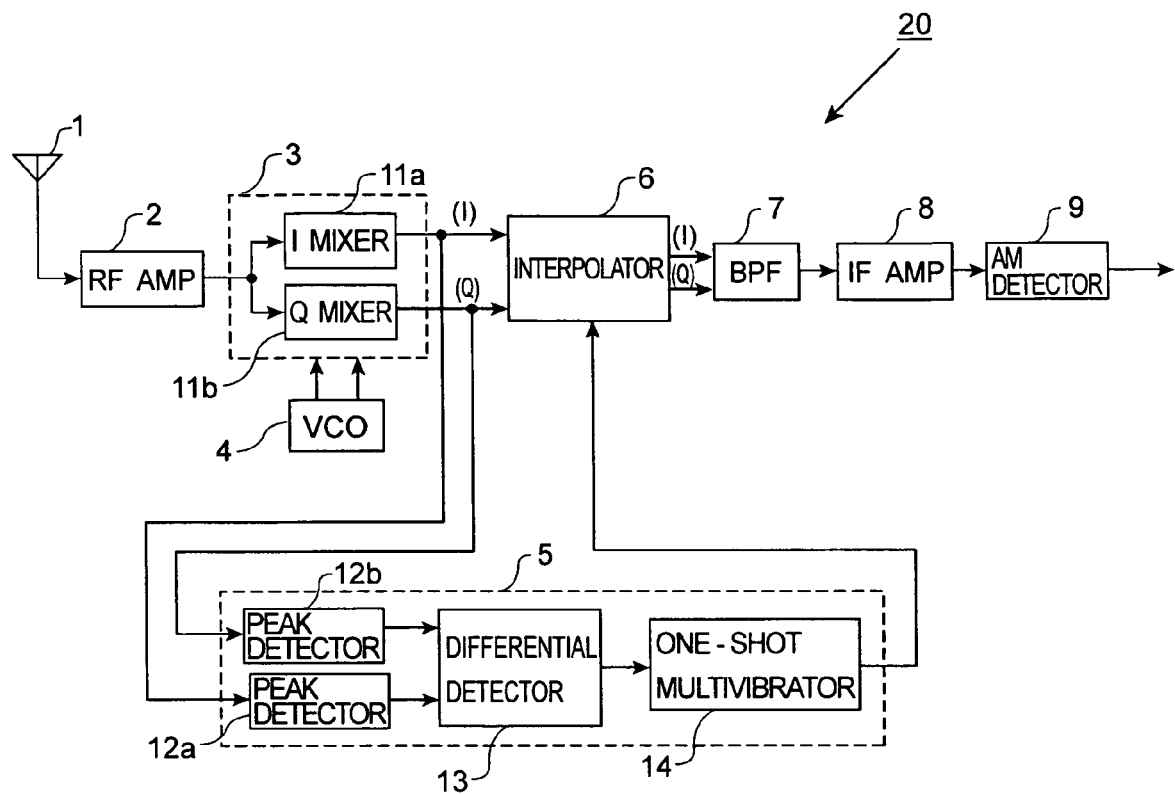
FIG. 1 is a block diagram of a single heterodyne type AM receiver in accordance with a first embodiment of the present invention.

Embodiments of the present invention will be explained below with reference to the attached drawings. It should be noted that the present invention is not limited to the embodiments but covers their equivalents. Throughout the attached drawings, similar or same reference numerals show similar, equivalent or same components. The drawings, however, are shown schematically for the purpose of explanation so that their components are not necessarily the same in shape or dimension as actual ones. In other words, concrete shapes or dimensions of the components should be considered as described in these specifications, not in view of the ones shown in the drawings. Further, some components shown in the drawings may be different in dimension or ratio from each other.

FIRST EMBODIMENT

A receiver of the first embodiment in accordance with the present invention is described with reference to the drawings. FIG. 1 is a block diagram of a single heterodyne type AM receiver. In order to eliminate or reduce impulse noise, an I/Q mixer, an impulse noise detector and an interpolator are provided in the embodiment.

As shown in FIG. 1, AM receiver 20 is provided with antenna 1, RF amplifier 2, I/Q mixer 3, voltage controlled oscillator (VCO) 4, impulse noise detector 5, interpolator 6, band pass filter (BFF) 7, intermediate frequency (IF) amplifier 8 and AM detector 9. Antenna 1 receives outer electromagnetic waves (AM signals) and supplies the signal to RF amplifier 2 through a filter (not shown). RF amplifier 2 amplifies weak outer signals received through antenna 1.

VCO 4 functioning as a voltage controlled oscillator outputs a local oscillation signal, the frequency of which is different from a receiving frequency by a predetermined frequency. I/Q mixer 3 are composed of I mixer 11a as an in-phase mixer and Q mixer 11b as an orthogonal mixer. Both I mixer 11a and Q mixer 11b are supplied with the local oscillation signals from VCO 4 and the output signal from RF amplifier 2 to carry out mixing operations. However, the local oscillation signal supplied to Q mixer 11b from VCO 4 called a reference or in-phase local oscillation signal is phase-shifted by 90° from the local oscillation signal supplied to I mixer 11a from VCO 4 called an orthogonal local oscillation signal. I mixer 11a and Q mixer 11b are made of double balanced mixers.

Impulse noise detector 5 includes peak detectors 12a and 12b, differential detector 13 and one-shot multivibrator 14. Peak detector 12a detects a peak of an input signal supplied from I mixer 11a. Peak detector 12b also detects a peak of an input signal supplied from Q mixer 11b but the phase of such an input signal is shifted by 90° from that of the input signal supplied to peak detector 12a from I mixer 11a. Differential detector 13 is supplied with output signals from peak detectors 11a and 11b and carries out the detection of differences between them. One-shot multivibrator 14 receives an output signal from differential detector 13 and forms an output pulse signal with a fixed width determined by a value of a time constant circuit provided with a resistor and a capacitor in multivibrator 14.

In order to eliminate or reduce impulse noise, interpolator 6 carries out a waveform-shaping or interpolating process with respect to output signals from I mixer 11a and Q mixer 11b in response to the output pulse from impulse noise detector 5 as an interpolation signal. Here, interpolator 6 includes a sample-hold circuit.

BPF 7 functions as an IF filter and receives output signals of I mixer 11a and Q mixer 11b subjected to the process of waveform shapes or interpolations by interpolator 6. Further, BPF 7 shifts a phase of either one of such output signals of I mixer 11a and Q mixer 11b by 90° and synthesizes the same with the other of such output signals of I mixer 11a and Q mixer 11b. IF amplifier 8 amplifies an output IF signal from BPF 7. AM detector 9 receives an output signal amplified by IF amplifier 8 and carries out an AM detection of the same.

Next, the reduction of impulse noise in a single heterodyne type AM receiver will be explained with reference to FIGS. 2A-4G. FIGS. 2A-2G and 3A-3H show operation timing charts of the single heterodyne type AM receiver at the receipt of impulse noise while FIGS. 4A-4G show operation timing charts of the single heterodyne type AM receiver at the receipt of neighboring disturbance signals. It is noted, however, that each phase angle of impulse noises output from I mixer 11a and Q mixer 11b is π/2 radian for convenience of illustrations.

Figure 2A:
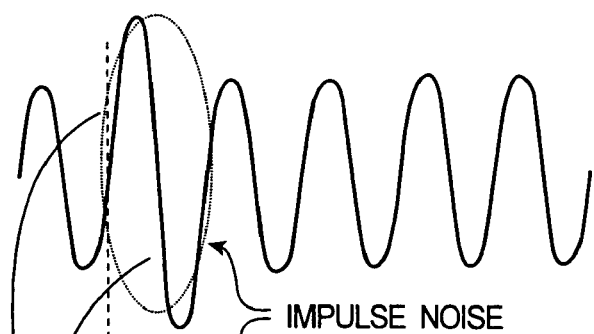
Figure 2B:
Figure 2G:
Figure 2G:
Figure 2G:
Figure 2G:
Figure 2G:
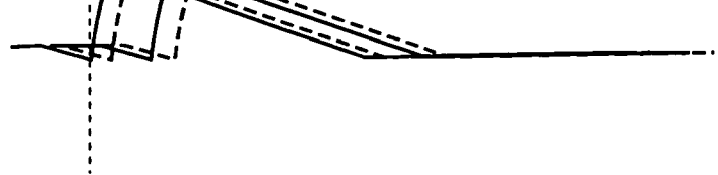

As described above, an AM signal received from antenna 1 is amplified by RF amplifier 2 and an output AM signal from RF amplifier 2 is provided to I/Q mixer 3. I mixer 11a of I/Q mixer 3 outputs an in-phase or reference IF signal as shown in FIG. 2A while Q mixer of I/Q mixer 3 outputs an orthogonal IF signal shifted by 90° with respect to the in-phase or reference IF signal as shown in FIG. 2B. Here, impulse noise of the orthogonal IF signal is also shifted by 90° with respect to the in-phase IF signal.

The in-phase IF signal output from I mixer 11a is provided to peak detector 12a in which (+side) and (−side) impulse noises are detected as shown in FIGS. 2C and 2D, respectively. The in-phase IF signal output from Q mixer 11b is also provided to peak detector 12b in which (+side) 90° and (−side) 90° shifted impulse noises are detected as shown in FIGS. 2E and 2F, respectively. Output signals from peak detectors 12a and 12b are shown in FIG. 2 G, where (−side) peak detected signals are inverted to (+side) signals.

Figure 3A:
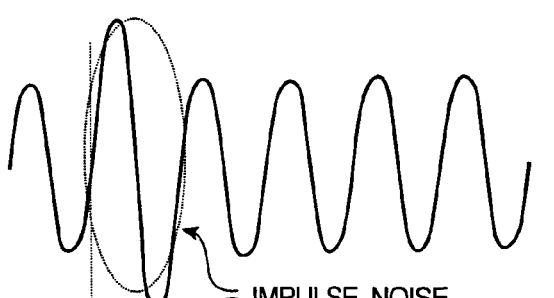
FIG. 3A-3H are timing charts at the input of one impulse noise to the AM receiver shown in FIG. 1.
Figure 3B:
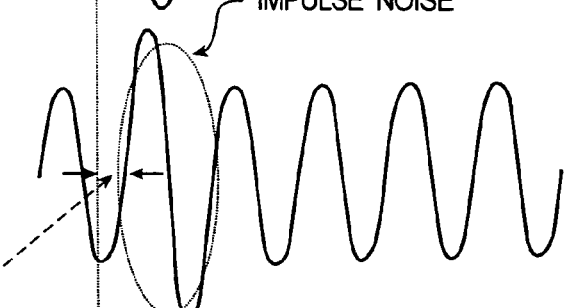
Figure 3C:
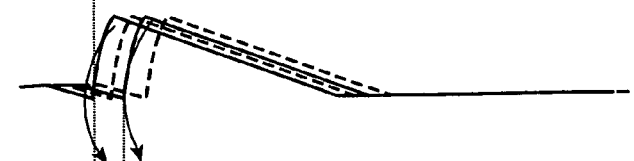
Figure 3D:
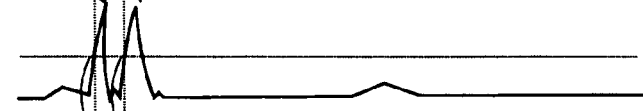
Figure 3E:

Referring now to FIGS. 3A-3H, for convenience of explanation, the output signals from 1 mixer 11a and Q mixer 11b and 11b are again shown in FIGS. 3A and 3B while those from peak detectors 12a and 12b and differential detector 13 are also shown again in FIGS. 3C and 3D, respectively. As set forth above, the output signals from peak detectors 12a and 12b are input to differential detector 13. Differential detector 13 detects the difference between the (+side) peak signal and (+side) 90° shifted peak signals detected by peak detectors 12a and 12b as shown in FIG. 3C (i.e., two saw-toothed waveforms illustrated with solid lines). Differential detector 13 also detects the difference between the (−side) peak signal and the (−side) 90° shifted peak detected by signal peak detectors 12a and 12b as shown in FIG. 3C (i.e., two saw-toothed waveforms illustrated with doted lines). Differential detector 13 then detects a period of time, T1, between timings at which the first and second (+side) saw-toothed waveforms reach a noise threshold value as shown in FIG. 3D, respectively. As a result, differential detector 13 outputs a rectangular-waveform pulse as shown in FIG. 3E.

Figure 3F:

The rectangular-waveform pulse from differential detector 13 is provided to one-shot multivibrator 14, which, in turn, generates a fixed width pulse determined by a time constant included in multivibrator 14. A period of time, T2, is detected in response to such a pulse and a threshold value of one-shot multivibrator 14 as shown in FIG. 3F.

Figure 3G:
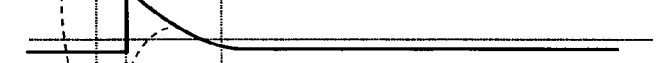
Figure 3H:

Consequently, an output pulse signal from multivibrator 14 of impulse noise detector 5 is supplied to interpolator 6 as an interpolating signal. Interpolator 6 carries out a waveform interpolating or waveform shaping (impulse noise elimination) process for the in-phase and orthogonal IF signals output from I mixers 11a and Q mixer 11b, respectively, during the periods of time T1 and T2. The in-phase and orthogonal IF signals subjected to the impulse noise elimination process shown in FIGS. 3G and 3H are provided to BPF 7, which synthesizes the in-phase and orthogonal IF signals into an impulse noise eliminated signal.

Further, the elimination or reduction of neighboring disturbance signals will be described with reference to FIGS. 4A-4G. An AM signal received from antenna 1 is amplified by RF amplifier 2, an output AM signal from which is provided to I/Q mixer 3. I mixer 11a of I/Q mixer 3 outputs an in-phase IF signal as shown in FIG. 4A while Q mixer 11b of I/Q mixer 3 outputs an orthogonal IF signal shifted by 90° with respect to the in-phase IF signal as shown in FIG. 4B. It is noted that the in-phase and orthogonal IF signals include neighboring disturbance signals as shown in FIGS. 4A and 4B.

The in-phase IF signal output from I mixer 11a is provided to peak detector 12a in which (+side) and (−side) impulse noises are detected. The in-phase IF signal output from Q mixer 11b is also provided to peak detector 12b in which (+side) and (−side) 90° shifted impulse noises are detected as shown in FIG. 4C. Here, (−side) peak detected signals are inverted to (+side) signals.

Output pulses from peak detectors 12a and 12b are provided to differential detector 13, which detects the difference between the (+side) peak detected signal and the (+side) 90° shifted peak detected signal and the difference between the (−side) peak detected signal and the (−side) 90° shifted peak detected signal as shown in FIG. 4D (two saw-toothed waveforms). Since the neighboring disturbance signal has a few consecutive fluctuation components, those after the third waveform become less in amplitude than a noise threshold value as shown in FIG. 4D. Differential detector 13 then detects a period of time T1 between timings at which the first and second (+side) saw-toothed waveforms reach the noise threshold value, so that differential detector 13 outputs a rectangular-waveform pulse as shown in FIG. 4E.

The rectangular-waveform pulse from differential detector 13 is provided to one-shot multivibrator 14, which, in turn, generates a fixed width pulse of a time constant of multivibrator 14. A period of time T2 is detected in response to such a fixed width pulse and a threshold value of one-shot multivibrator 14 as shown in FIG. 4F.

Consequently, an output pulse signal from multivibrator 14 of impulse noise detector 5 is supplied to interpolator 6 as an interpolating signal. Interpolator 6 carries out a waveform interpolating or waveform shaping (impulse noise elimination) process for the in-phase and orthogonal IF signals output from I mixer 11a and Q mixer 11b, respectively, during the periods of time T1 and T2. The in-phase and orthogonal IF signals subjected to the impulse noise elimination process shown in FIG. 4G are provided to BPF 7, which synthesizes the in-phase and orthogonal IF signals into an impulse noise eliminated signal.

As described above, the receiver of this embodiment is provided with I/Q mixer 3 in which I mixer 11a and Q mixer 11b output the in-phase and orthogonal IF signals, respectively, and impulse noise detector 5 which receives the in-phase and orthogonal IF signals from I/Q mixer 3 and detects impulse noises from them to output the interpolation signal, and interpolator 6 which receives the interpolation signal to carry out the waveform interpolation or waveform processing of the in-phase and orthogonal IF signals.

With the structure, echo noises resulting from impulse noises generated in the receiver can be limited to ½ or less in magnitude. A filter provided for the conventional detection of impulse noises is unnecessary in this embodiment so that undesired voice signal stop periods due to echo noises by the filter can be avoided. According to the present embodiment, since occurrence timings and periods of time of impulse noises can be detected by the differentiation of the in-phase and orthogonal IF signals, detection errors due to neighboring disturbance signals can be improved beyond those of a conventional receiver. Further, since no AGC circuit is necessary for the detection of impulse noises, impulse noises can be detected from intrinsic signals even in strong electric fields.

Although BPF 7 phase-shifts by 90° either one of the in-phase and orthogonal IF signals output from interpolator 6 and synthesizes the same with the other IF signal to generate the predetermined IF signal, interpolator 6 instead can carry out the same and provide the predetermined IF signal to BPF 7.

SECOND EMBODIMENT

Figure 5:
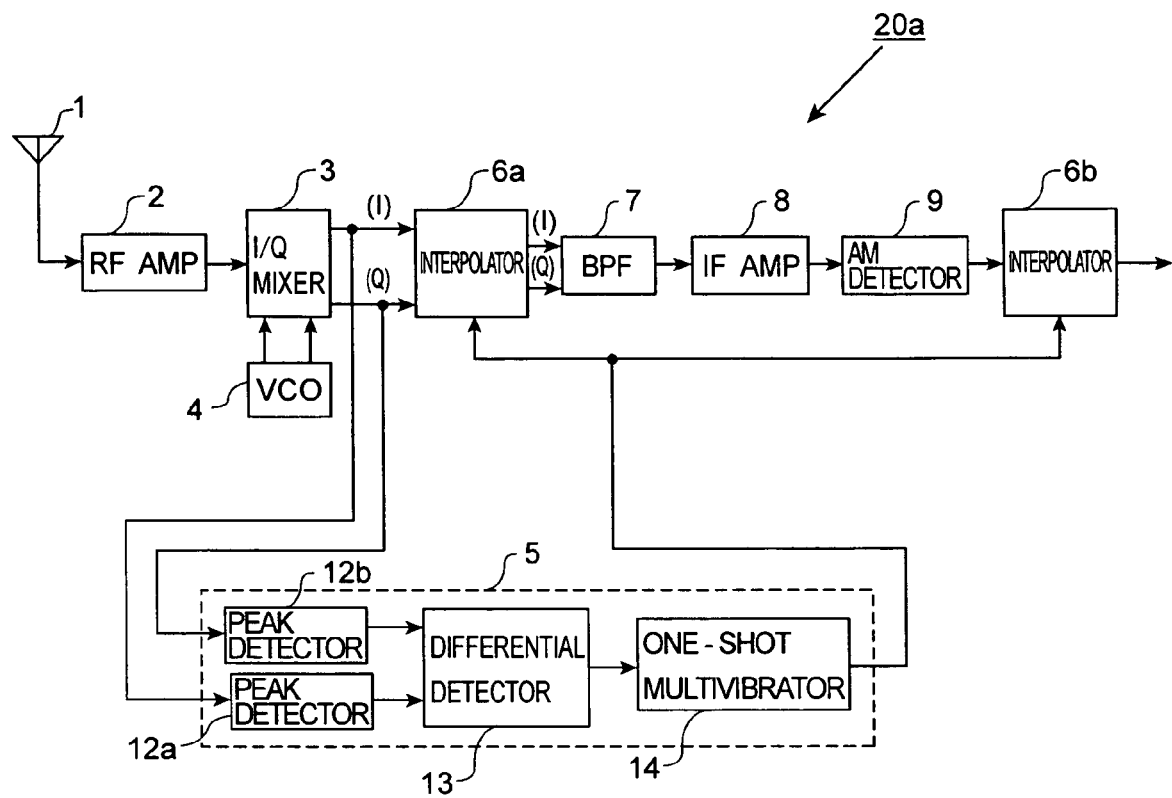
FIG. 5 is a block diagram of a single heterodyne type AM receiver in accordance with a second embodiment of the present invention.

Now referring to FIG. 5, a receiver in accordance with the second embodiment of the present invention will be described. FIG. 5 is a block diagram of a single heterodyne type AM receiver. In this embodiment, an additional interpolator is provided on the output side of an AM detector.

Components identical or similar to those of the first embodiment use the same reference numerals so that their explanations are omitted and only different components will be described below in detail.

As shown in FIG. 5, AM receiver 20a is provided with antenna 1, RF amplifier 2, I/Q mixer 3, VCO 4, impulse noise detector 5, interpolators 6a and 6b, BPF 7, IF amplifier 8 and AM detector 9.

Interpolator 6a is supplied with output signals from I/Q mixer 3, carries out waveform-interpolations of the output signals in response to an interpolation signal output from impulse noise detector 5 and eliminates impulse noises from them. Interpolator 6b is supplied with an output signal detected through AM detector 9 and carries out waveform-interpolations or shaping waveforms of the output signals in response to an interpolation signal output from impulse noise detector 5. Interpolators 6a and 6b are composed of sample-hold circuits.

As described above, the receiver of this embodiment includes I/Q mixer 3 composed of I mixer 11a and Q mixer 11b to output the in-phase IF and orthogonal signals, respectively, impulse noise detector 5 to detect impulse noises from the in-phase and orthogonal IF signals and output an interpolation signal, interpolator 6a to interpolate the in-phase and orthogonal IF signals in response to the interpolation signal and reduce the impulse noises and interpolator 6a to interpolate an output signal from AM detector in response to the interpolation signal and carry out the reduction or waveform shaping process of the impulse noises.

With the structure set forth immediately above, the receiver of the second embodiment can suppress echo noises resulting from the impulse noises generated in the receiver more effectively than the receiver of the first embodiment. Further, it is unnecessary to provide a filter conventionally required for the detection of impulse noises and it is also possible to reduce echo noises generated in BPF and resulting from the elimination of impulse noises of the IF signal. Since the receiver of the second embodiment can detect occurrence time and duration of impulse noises from difference between the in-phase and orthogonal IF signals, detection errors due to neighboring interference signals can be more improved than a conventional receiver. In addition, any AGC circuit for the detection of impulse noises is not required so that impulse noises can be detected even where a desired signal is in a strong electric field.

THIRD EMBODIMENT

Figure 6:
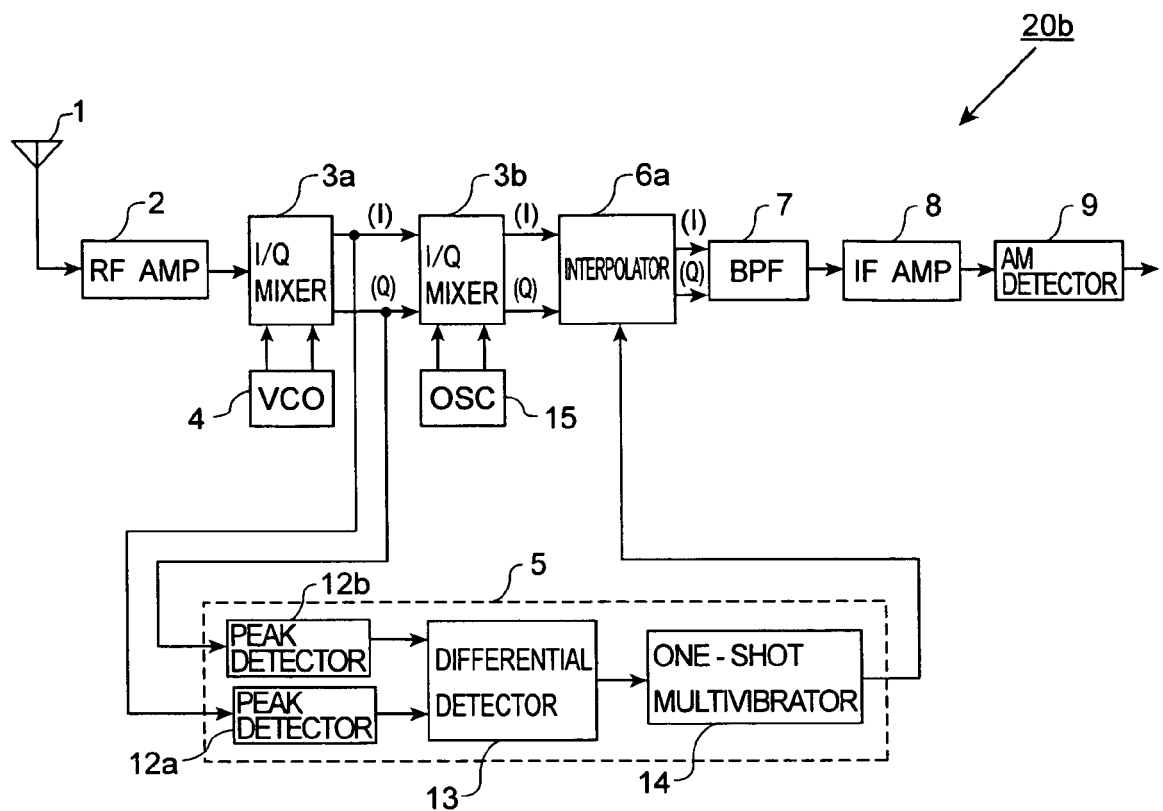
FIG. 6 is a block diagram of a double heterodyne type AM receiver in accordance with a third embodiment of the present invention.

Now referring to the attached drawings, a receiver of the third embodiment will be described. FIG. 6 is a block diagram of a double super heterodyne type AM receiver. The receiver of this embodiment includes two I/Q mixers.

Components identical or similar to those of the first embodiment use the same reference numerals so that their explanations are omitted and only different components will be described below in detail.

As shown in FIG. 6, AM receiver 20b is provided with antenna 1, RF amplifier 2, I/Q mixers 3a and 3b, VCO 4, impulse noise detector 5, interpolator 6, BPF 7, IF amplifier 8, AM detector 9 and oscillator (OSC) 15. Here, since the structure of I/Q mixers 3a and 3b is in two stages, characteristics of output signals supplied from I/Q mixers 3a and 3b to interpolator 6 are improved, so that loads for latter stages than I/Q mixers 3a and 3b, such as interpolator 6, are reduced. Here, since I/Q mixers 3a and 3b are two stages, a load of a later stage than I/Q mixer 3b such as that of interpolator 6a is eased in the case that the IF signal is set to a low frequency signal.

OSC 15 outputs a local oscillation signal, the frequency of which is shifted by a fixed frequency from a received frequency. I/Q mixer 3a is composed of I and Q mixers not shown but functioning as in-phase and orthogonal mixers, respectively. Each of the I and Q mixers of I/Q mixer 3a receives the local oscillation signals from VCO 4 and an output signal from RF amplifier 2 and carries out mixing them. I/Q mixer 3b is also composed of I and Q mixers not shown but functioning as in-phase and orthogonal mixers, respectively. I/Q mixer 3b, on the other hand, receives the local oscillation signals from OSC 15 and the output signals from the I and Q mixers of I/Q mixer 3a and carries out mixing them.

As set forth in the third embodiment, AM receiver 20b includes I/Q mixers 3a in which the I and Q mixers output the in-phase and orthogonal IF signals, respectively, impulse noise detector 5 which receives the in-phase and orthogonal IF signals and detects impulse noises from the in-phase and orthogonal IF signals to output an interpolation signal, and interpolator 6 which carries out a waveform interpolation or a waveform shaping of the in-phase and orthogonal IF signals to eliminate the impulse noises. Thus, the receiver of the third embodiment has substantially the same effect as that of the first embodiment.

Although interpolator 6 is provided for the receiver of the present embodiment, another interpolator may be additionally connected to AM detector 9.

FOURTH EMBODIMENT

Figure 7:
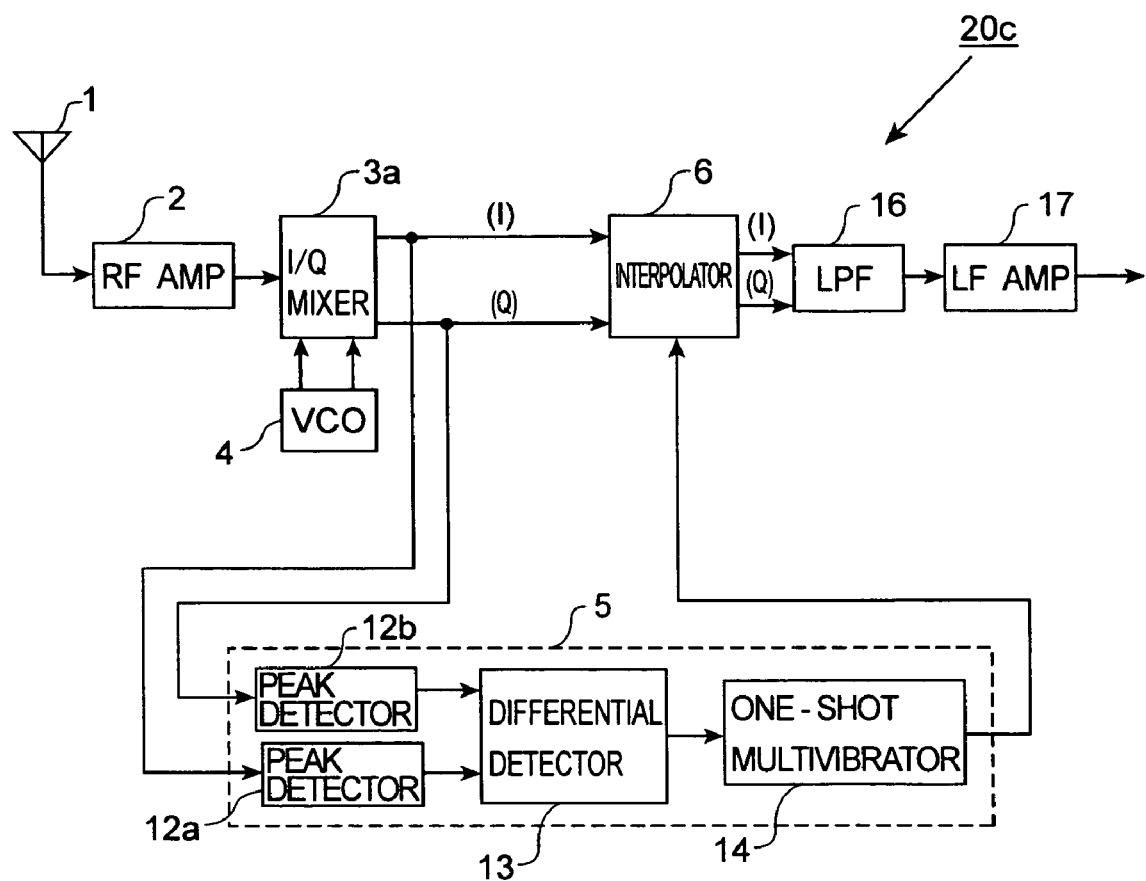
FIG. 7 is a block diagram of a direct synchronous detection type AM receiver in accordance with a fourth embodiment of the present invention.

Now referring to FIG. 7, a receiver in accordance with the fourth embodiment of the present invention will be described. FIG. 7 is a block diagram of a direct synchronous detection type AM receiver.

Components identical or similar to those of the first embodiment use the same reference numerals so that their explanations are omitted and only different components will be described below in detail.

As shown in FIG. 7, AM receiver 20c is provided with antenna 1, RF amplifier 2, I/Q mixer 3, VCO 4, impulse noise detector 5, interpolator 6, low pass filter (LPF) 16, low frequency (LF) amplifier 17.

LPF 16 is supplied with waveform interpolated in-phase and orthogonal output signals from I/Q mixer 3, eliminates high frequency components of those two signals, phas-shifts either one of the two signals by 90° and synthesizes the 90° shifted signal with the other signal to generate an output signal. LF amplifier 17 amplifies the output signal from LPF 16.

As set forth in the fourth embodiment, AM receiver 20c includes I/Q mixer 3 which outputs in-phase and orthogonal LF signals, impulse noise detector 5 which receives the in-phase and orthogonal LF signals from I/Q mixer 3a and detects impulse noises from the same LF signals to output an interpolation signal, and interpolator 6 which carries out a waveform interpolation or a waveform shaping process of the in-phase and orthogonal LF signals to eliminate impulse noises. Thus, the receiver of the fourth embodiment has the same effect as that of the first embodiment.

Interpolator 6 is provided for the receiver of the third embodiment but another interpolator may be additionally connected to an output terminal of LF amplifier 17.

FIFTH EMBODIMENT

Figure 8:
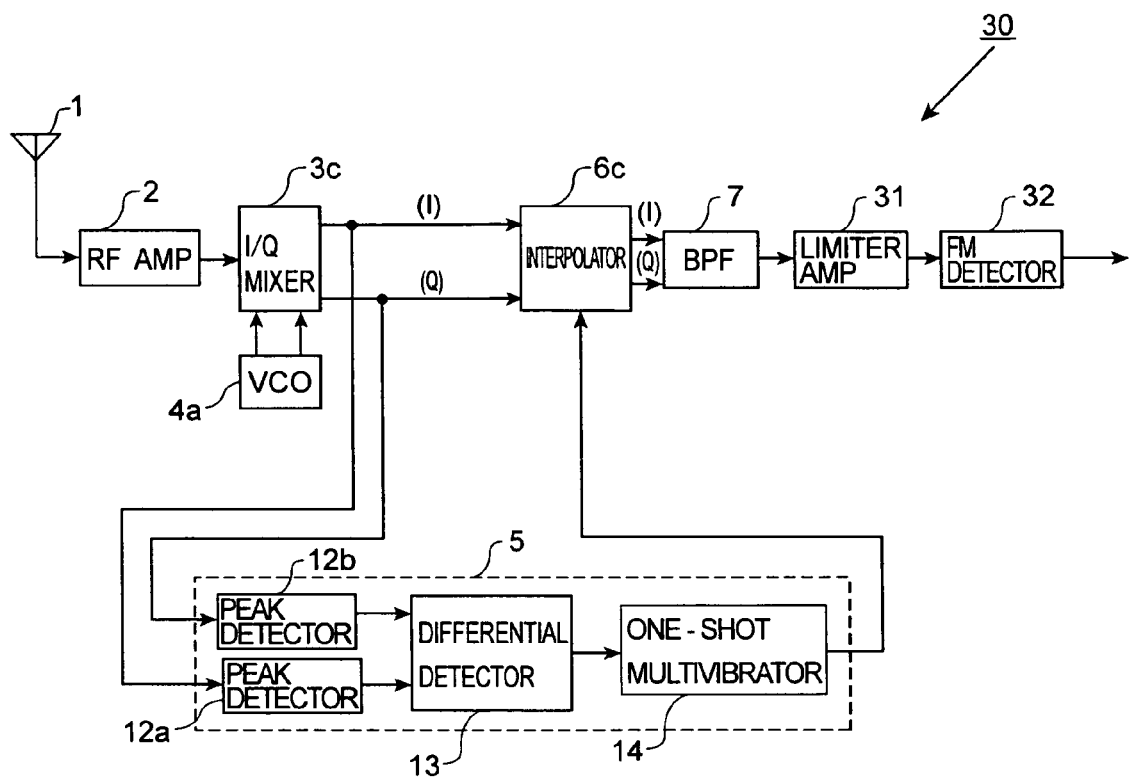
FIG. 8 is a block diagram of a single heterodyne type AM receiver in accordance with a fifth embodiment of the present invention.

Now referring to FIG. 8, a receiver in accordance with the fifth embodiment of the present invention will be described. FIG. 8 is a block diagram of a single heterodyne type frequency modulation (FM) receiver.

Components identical or similar to those of the first embodiment use the same reference numerals so that their explanations are omitted and only different components will be described below in detail.

As shown in FIG. 8, FM receiver 30 is provided with antenna 1, RF amplifier 2, I/Q mixer 3, VCO 4a, impulse noise detector 5, interpolator 6c, BPF 7, limiter amplifier 31 and FM detector 32. Since FM detector 32 detects frequency or phase modulated components, FM receiver 30 is less affected by amplitude fluctuations caused by impulse noises than an AM receiver would be but is rather influenced by phase fluctuations in noises. Thus, FM receiver 30 is provided with impulse noise detector 5 and interpolator 6c to avoid mixing signals with such phase fluctuations caused by impulse noises.

Antenna 1 receives outer electromagnetic waves (FM signals) and provides the same to RF amplifier 2 through a filter not shown in FIG. 8. RF amplifier 2 amplifies weak outer signals received through antenna 1. I/Q mixer 3c is composed of an in-phase I mixer and an orthogonal Q mixer which are not shown in FIG. 8. Each of the I and Q mixers is supplied with a local oscillation signal from VCO 4a and an output signal from RF amplifier 2 to carry out their mixing operations. Here, the I and Q mixers are each composed of a double balanced mixer (DBM).

Peak detector 12a detects a peak of an output signal from the I mixer. Further, peak detector 12b also detects a peak of an output signal from the Q mixer, the phase of which is shifted by 90° with respect to that of the output signal from the I mixer. Differential detector 13 detects differences between output signals from peak detectors 12a and 12b. One-shot multivibrator 14 receives a pulse signal from differential detector to generate a pulse signal, the width of which is determined by a value of a time constant composed of resistors and capacitors in one-shot multivibrator 14.

Interpolator 6c receives the output signals from I/Q mixer 3c and carries out a waveform interpolation or a waveform shaping process of the same in response to an interpolation signal from impulse noise detector 5 to eliminate impulse noises.

BPF 7 functioning as an IF filter receives the output signals of the I/Q mixer 3c subjected to the waveform interpolation by interpolator 6c, adjusts phases of the output signals and combines the same into an output signal. Limiter amplifier 31 functioning as an IF limiter amplifier amplifies the output signal from BPF 7. FM detector 32 receives a signal amplified by limiter amplifier 31 and carries out an FM detection of the same.

As described above, the receiver of the fifth embodiment is provided with I/Q mixer 3c which outputs the in-phase and orthogonal IF signals, impulse noise detector 5 which receives the same and detects impulse noises in an IF region to generate the interpolation signal, and interpolator 6c which carries out the waveform interpolation or waveform shaping process of the in-phase and orthogonal IF signals in response to the interpolation signal to eliminate phase fluctuation noises caused by the impulse noises.

With that structure, no impulse noises to disturb phase information are detected by FM detector 32. Thus, a desired FM detection signal is output from FM detector 32.

Interpolator 6c is provided for the receiver of the fifth embodiment but another interpolator may be additionally connected to an output terminal of FM detector 32.

SIXTH EMBODIMENT

Figure 9:
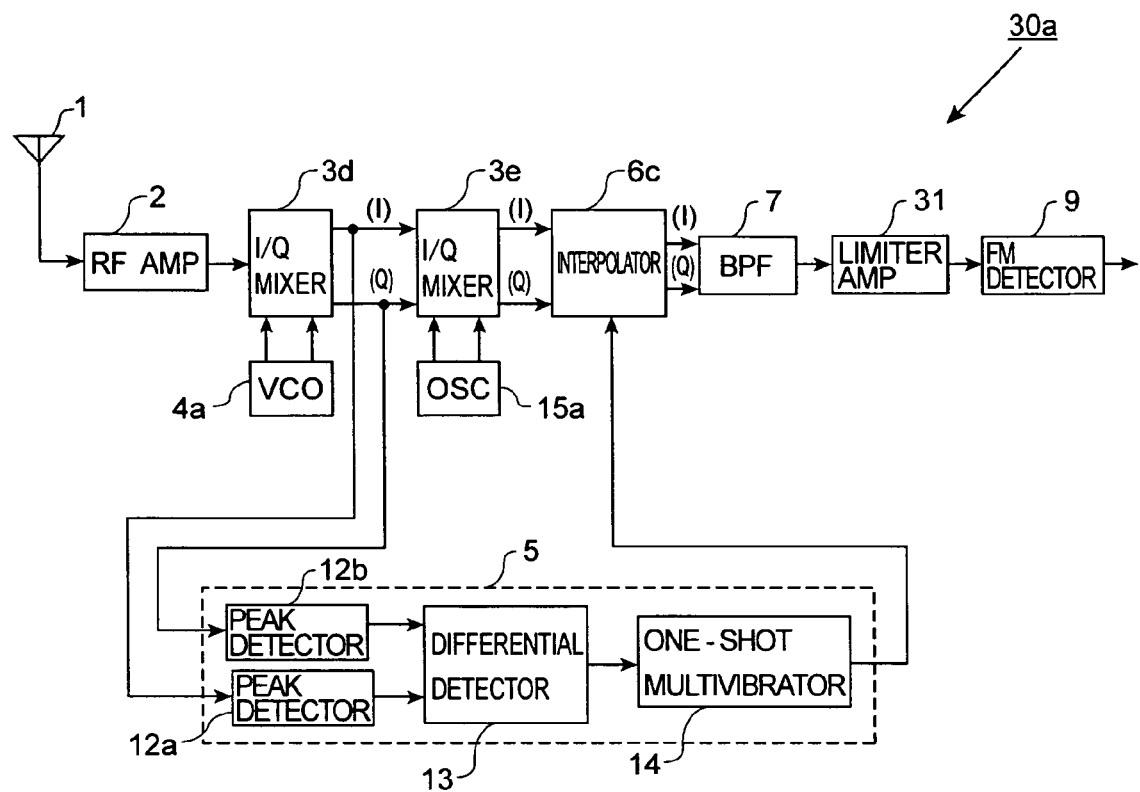
FIG. 9 is a block diagram of a double heterodyne type AM receiver in accordance with a sixth embodiment of the present invention.

Now referring to FIG. 9, a receiver in accordance with the sixth embodiment of the present invention will be described. FIG. 9 is a block diagram of a double heterodyne type FM receiver.

Components identical or similar to those of the fifth embodiment use the same reference numerals so that their explanations are omitted and only different components will be described below in detail.

As shown in FIG. 9, FM receiver 30a is provided with antenna 1, RF amplifier 2, I/Q mixer 3d, I/Q mixer 3e, VCO 4a, impulse noise detector 5, interpolator 6c, BPF 7, oscillator (OSC) 15a, limiter amplifier 31 and FM detector 32.

I/Q mixer 3d is composed of an in-phase I mixer and an orthogonal Q mixer which are not shown in FIG. 9. Each of the I and Q mixers is supplied with a local oscillation signal from VCO 4a and an output signal from RF amplifier 2 to carry out their mixing operations. I/Q mixer 3e is also composed of an in-phase I mixer and an orthogonal Q mixer which are not shown in FIG. 9. Each of the I and Q mixers is supplied with a local oscillation signal from OSC 15a and output signals from I/Q mixer 3d to carry out their mixing operations.

As described above, the receiver of the sixth embodiment is provided with I/Q mixer 3d which is composed of the I and Q mixers to output the in-phase and orthogonal IF signals, respectively, and carries out the mixing operation, impulse noise detector 5 which receives the in-phase and orthogonal IF signals and detects the impulse noises in the IF region to generate the interpolation signal, and interpolator 6c which carries out the waveform interpolation or waveform shaping process of the in-phase and orthogonal IF signals in response to the interpolation signal to eliminate the phase fluctuation noises caused by the impulse noises.

With that structure, no impulse noises to disturb phase information are detected by FM detector 32. Thus, a desired FM detection signal is output from FM detector 32.

Interpolator 6c is provided for the receiver of the sixth embodiment but another interpolator may be additionally connected to an output terminal of FM detector 32.

SEVENTH EMBODIMENT

Figure 10:
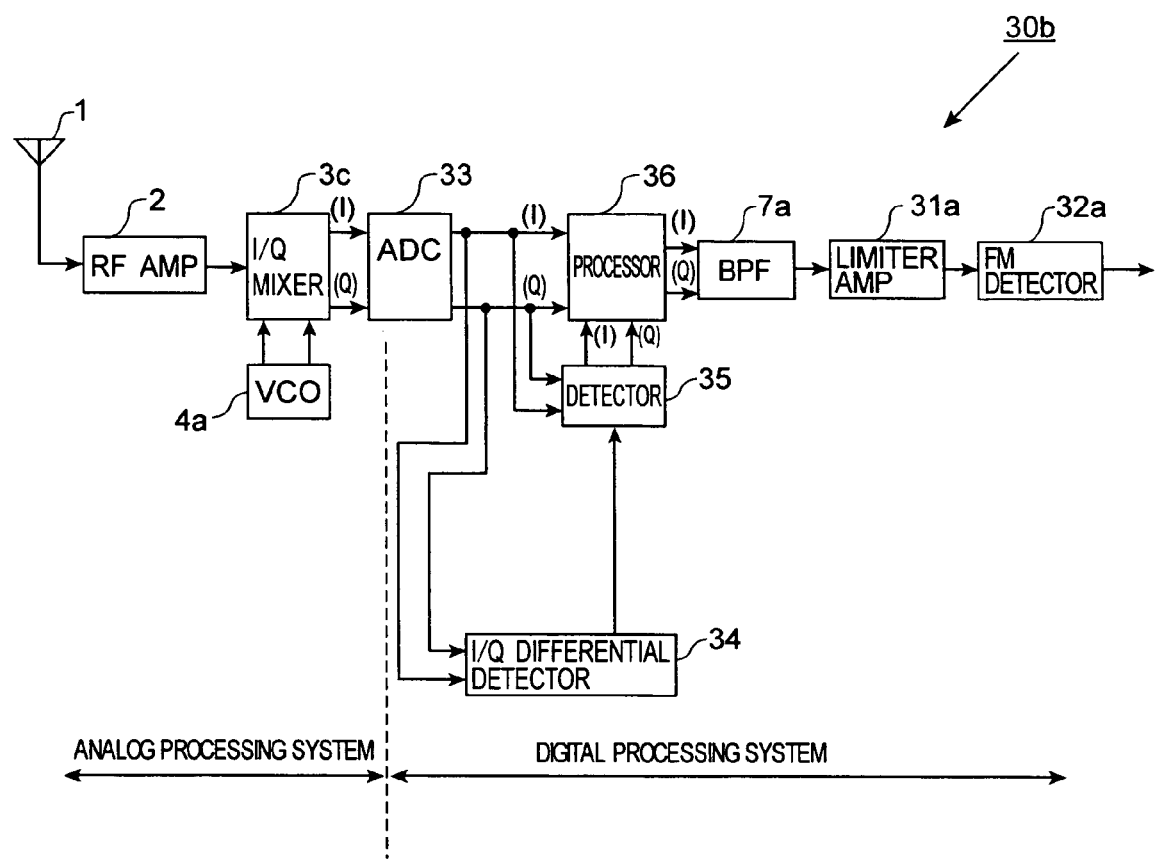
FIG. 10 is a block diagram of a single heterodyne type AM receiver in accordance with a seventh embodiment of the present invention.

Now referring to FIG. 10, a receiver in accordance with the seventh embodiment of the present invention will be described. FIG. 10 is a block diagram of a single heterodyne type FM receiver.

In the present embodiment, the arithmetic process of a constant modulus algorithm (CMA) operation is executed to eliminate phase fluctuation noises caused by impulse noises from output signals of I and Q mixers digitized by an analog-to-digital converter (ADC).

Components identical or similar to those of the fifth embodiment use the same reference numerals so that their explanations are omitted and only different components will be described below in detail.

As shown in FIG. 10, FM receiver 30b is provided with antenna 1, RF amplifier 2, I/Q mixer 3c, VCO 4a, ADC 33, I/Q differential detector 34, detector 35, processor 36, BPF 7a, limiter amplifier 31a and FM detector 32a.

ADC 33 converts analog signals output from 1 and Q mixers of I/Q mixer 3c into digital signals. Here, in order to maintain a predetermined bit precision, ADC 33 preferably outputs not less than 12 bits.

I/Q differential detector 34 detects differences between digital output signals from ADC 33 corresponding to those of the I mixer and Q mixer, and generates a synchronous signal to synchronize start and stop timings of phase fluctuation noises caused by impulse noises.

Detector 35 receives the digital output signals from ADC 33 corresponding to those of the I and Q mixers, carries out an arithmetic operation with reference to the synchronous signal from I/Q differential detector 34, and detects a distorted degree of impulse noises, multiple-path noises, etc. The distorted degrees output from detector 35 becomes digital signal components corresponding to the output signals of the I and Q mixers. Here, a constant envelope signal algorithm such as CMA is used for the arithmetic operation to detect the distorted degrees. In the case of the CMA, a non-linear last squares method CMA with a low bit error rate is preferably used but a steepest descent method CMA with a lesser calculation load may be also used.

Processor 36 receives digital output signals (I) and (Q) from ADC 33 and carries out arithmetic operations for the distorted degrees of the digital signals (I) and (Q) from detector 35 and ADC 33 to eliminate phase fluctuation noises caused by impulse noises contained in the received signal.

BPF 7a functioning as an IF filter receives output signals (I) and (Q) from processor 36, eliminates the phase fluctuation noises, and provides an output signal. Limiter amplifier 31a functioning as an IF limiter amplifier amplifies the output signal from BPF 7a. FM detector 32a receives an output signal from BPF 7a and carries out an FM detection.

As described above, the receiver of the seventh embodiment is provided with I/Q mixer 3c which is composed of the I and Q mixers to output the in-phase and orthogonal IF signals, respectively, ADC 33 which converts the output signals from the I and Q mixers into the digital signals, I/Q differential detector 34 which receives the in-phase and orthogonal IF digital signals, detects impulse noises from the same, and output the synchronous signal, and processor 36 which carries out the arithmetic operation by the CMA, for instance, in response to the synchronous signal and eliminates the phase fluctuation noises resulting from the impulse noises of the in-phase and orthogonal IF signals.

With that structure, no impulse noises to disturb phase information are detected by FM detector 32a. Thus, a desired FM detection signal is output from FM detector 32a.

The present invention is not limited to the embodiments but may be subjected to various modifications without departing from the scope of the invention defined in the attached claims.

The present invention is applied to the FM receiver of the seventh embodiment, for example, but may be also applied to receivers with other demodulators than the FM detector. Although the description is only directed to the FM receiver in the seventh embodiment, AM and FM receivers may be provided in same equipment. The CMA by way of example as the constant envelope signal algorithm is used to eliminate impulse noises of the FM receiver in the seventh embodiment, an arithmetic operation by a CMA applied to an AM receiver may be used.

In the foregoing description, certain terms have been used for brevity, clearness and understanding, but no unnecessary limitations are to be implied therefrom beyond the requirements of the prior art, because such words are used for descriptive purposes herein and are intended to be broadly construed. Moreover, the embodiments of the improved construction illustrated and described herein are by way of example, and the scope of the invention is not limited to the exact details of construction. Having now described the invention, the construction, the operation and use of embodiments thereof, and the advantageous new and useful results obtained thereby, the new and useful construction, and reasonable equivalents thereof obvious to those skilled in the art, are set forth in the appended claims.

What is claimed is:

1. A receiver system comprising AM and FM receivers:

the AM receiver including, an antenna to make first and second received signals out of transmitted signals, a first local oscillator to generate a first reference local oscillation signal and a first orthogonal local oscillation signal phase-shifted by 90° from the first reference local oscillation signal, a first I/Q mixer having a first I mixer and a first Q mixer wherein the first I mixer mixes the first received signal with the first reference local oscillation signal from the first local oscillator and the first Q mixer mixes the first received signal with the first orthogonal local oscillation signal from the first local oscillator, a first noise detector to carry out peak and differential detections of output signals from the first I/Q mixer to detect impulse noises in a form of a first pulse signal from the first received signal, a first interpolator carrying out shaping of waveforms of the output signals from the first I/Q mixer in response to the first pulse signal from the first noise detector, an AM detector to demodulate the output signal from the first interpolator, and a second interpolator carrying out shaping of waveforms of the output signals from the AM detector in response to the first pulse signal from the first noise detector; and the FM receiver including, a second local oscillator to generate a second reference local oscillation signal and a second orthogonal local oscillation signal phase-shifted by 90° from the second reference local oscillation signal, a second I/Q mixer having a second I mixer and a second Q mixer wherein the second I mixer mixes the second received signal with the second reference local oscillation signal from the second local oscillator and the second Q mixer mixes the first received signal with the second orthogonal local oscillation signal from the second local oscillator, a second noise detector to carry out peak and differential detections of output signals from the second I/Q mixer to detect impulse noises in a form of a second pulse signal from the second received signal, a third interpolator carrying out shaping of waveforms of the output signals from the second I/Q mixer in response to the second pulse signal from the second noise detector, an FM detector to demodulate the output signal from the first interpolator, and a fourth interpolator carrying out shaping of waveforms of the output signals from the FM detector in response to the second pulse signal from the second noise detector.

2. A receiver system according to claim 1, wherein each of the first and second noise detectors includes first and second peak detectors to carry out peak detections of the output signals of the I/Q mixer, respectively, a differential detector to detect differences between output signals from the first and second peak detectors and a pulse generator which receives output signals from the differential detector to detect impulse noises in a form of a pulse signal contained in the received signal.

3. A receiver according to claim 2, wherein the pulse generator is a one-shot multivibrator.

* * * * *